US010516487B1

United States Patent
Kang et al.

(10) Patent No.: US 10,516,487 B1
(45) Date of Patent: Dec. 24, 2019

(54) OPTICAL TRANSMITTING MODULE

(71) Applicant: ELECTRONICS AND TELECOMMUNICATIONS RESEARCH INSTITUTE, Daejeon (KR)

(72) Inventors: Sae-Kyoung Kang, Daejeon (KR); Joon Young Huh, Daejeon (KR); Joon Ki Lee, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/207,557

(22) Filed: Dec. 3, 2018

(30) Foreign Application Priority Data

Jul. 11, 2018 (KR) .................. 10-2018-0080265

(51) Int. Cl.
*H04B 10/516* (2013.01)
*G02B 6/42* (2006.01)

(52) U.S. Cl.
CPC ........... *H04B 10/516* (2013.01); *G02B 6/421* (2013.01); *G02B 6/4207* (2013.01); *G02B 6/4263* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,076,675 A | * | 12/1991 | Kusaka | G02B 5/3033 359/484.04 |
| 5,195,155 A | * | 3/1993 | Shimaoka | G02B 6/4226 385/90 |
| 5,600,620 A | * | 2/1997 | Ohguri | G11B 7/1356 369/116 |
| 6,115,401 A | * | 9/2000 | Scobey | H01S 3/08036 372/100 |
| 6,410,906 B1 | * | 6/2002 | Ito | G01R 1/071 250/216 |

(Continued)

FOREIGN PATENT DOCUMENTS

EP 3255471 A1 12/2017

OTHER PUBLICATIONS

Takaharu Ohyama et al., "Compact Hybrid-Integrated 100-Gb/s TOSA Using EADFB Laser Array and AWG Multiplexer", IEEE Photonics Technology Letters, vol. 28, No. 7, Apr. 1, 2016.

*Primary Examiner* — Omar S Ismail

(74) *Attorney, Agent, or Firm* — LRK Patent Law Firm

(57) ABSTRACT

An optical transmitting module includes: light sources configured to output optical signals, an optical multiplexer configured to multiplex the optical signals output from the light sources, a collimating lens configured to convert an optical signal output from the optical multiplexer to a form of parallel beam, a package inside which the light sources, the optical multiplexer, and the collimating lens are provided, and an optical isolator disposed on one inner surface of the package, in which the optical signals output from the light sources are multiplexed into a single optical signal through the optical multiplexer disposed inside the package, and the single optical signal passes through the collimating lens and is then optically coupled to an optical fiber stub in a receptacle through a focusing lens disposed outside the package to be output externally.

11 Claims, 8 Drawing Sheets

(56) References Cited

U.S. PATENT DOCUMENTS

| | | | |
|---|---|---|---|
| 9,541,714 B2 | 1/2017 | Lim et al. | |
| 9,780,882 B2 | 10/2017 | Saeki et al. | |
| 2007/0134003 A1 | 6/2007 | Lee et al. | |
| 2007/0159773 A1* | 7/2007 | Deng | H01S 5/02292 361/600 |
| 2014/0300962 A1* | 10/2014 | Hosokawa | B23K 26/08 359/484.03 |
| 2016/0028489 A1* | 1/2016 | Saeki | H04B 10/506 398/79 |
| 2016/0291271 A1* | 10/2016 | Mizobuchi | G02B 6/4279 |
| 2018/0019569 A1* | 1/2018 | Law | H01S 5/02492 |

\* cited by examiner

OPTICAL TRANSMITTING MODULE

CROSS-REFERENCE TO RELATED APPLICATION

This application claims the priority benefit under 35 USC § 119(a) of Korean Patent Application No. 10-2018-0080265, filed Jul. 11, 2018, in the Korean Intellectual Property Office, the disclosure of which is incorporated herein by reference for all purposes.

BACKGROUND

1. Field

One or more example embodiments relate to an optical transmitting module, and more particularly, to a structure of a package used for an optical transmitting module to generate a modulated optical signal and output the generated optical signal in an optical communication system.

2. Description of Related Art

An optical transceiver may be a module configured to receive an electrical signal and generate a modulated optical signal, and receive the optical signal and convert the received optical signal to an electrical signal, and it may function as an optical interface at an end of an optical transmission system, a router, and the like. As a quantity of data to be transmitted increases, the transceiver may be required to have high-speed and small-sized optical transmitting module and optical receiving module which are core parts thereof.

For hermetic sealing, and functioning as an input and output interface for an electrical signal and an optical signal, a transistor outline (TO)-can type package or a box type package may be used. To transmit massive data at a high speed, the latter type package may be used.

An existing optical transmitting module may use such a box type package using a ceramic feedthrough. In this package, a light source (e.g., electro-absorption modulator integrated distributed feedback [EADFB] laser array), an optical multiplexer (e.g., arrayed waveguide grating [AWG] multiplexer), a collimating lens, and the like may be provided. In addition, the package may be connected to a receptacle (e.g., LC-receptacle) including an optical focusing lens and an optical isolator.

Such an existing optical transmitting module may be provided in a general structure in which the optical isolator is integrated in the receptacle. In such structure, a focal length required for optically coupling a collimated beam to an optical fiber stub in the receptacle through the focusing lens may be restricted by a size of the optical isolator, and a size of the optical transmitting module may thus increase.

SUMMARY

An aspect provides an optical transmitting module that may minimize a disadvantage of an existing structure of a package by integrating an optical isolator inside or outside the package, in lieu of a receptacle, to be suitable for an existing package standard.

According to an example embodiment, there is provided an optical transmitting module including a plurality of light sources each configured to output an optical signal, an optical multiplexer configured to multiplex optical signals output from the light sources, a collimating lens configured to convert an optical signal output from the optical multiplexer to a form of parallel beam, a package inside which the light sources, the optical multiplexer, and the collimating lens are provided, and an optical isolator disposed on one inner surface of the package and configured to block an optical signal reflected and returning from an outside of the optical transmitting module. The optical signals output from the light sources may be multiplexed into a single optical signal through the optical multiplexer disposed inside the package, and the single optical signal may pass through the collimating lens and be then optically coupled to an optical fiber stub in a receptacle through a focusing lens disposed outside the package to be output externally.

The package may further include an optical isolator housing on the one inner surface to fix the optical isolator. The optical isolator housing may be coupled to the package through hermetic sealing.

The optical isolator may be coupled to the optical isolator housing through hermetic sealing.

The optical isolator may be formed such that a side surface thereof to which an optical signal is input from the collimating lens is inclined at an angle.

Inner parts of the optical isolator may be provided in a circular form or a polygonal form.

The package of a transistor outline (TO)-can type or a box type may be applied to the optical transmitting module.

According to another example embodiment, there is provided an optical transmitting module including a plurality of light sources each configured to output an optical signal, an optical multiplexer configured to multiplex optical signals output from the light sources, a collimating lens configured to convert an optical signal output from the optical multiplexer to a form of parallel beam, a package inside which the light sources, the optical multiplexer, and the collimating lens are provided, and an optical isolator disposed not in a receptacle but on one outer surface of the package, and configured to block an optical signal reflected and returning from an outside of the optical transmitting module. The optical signals output from the light sources may be multiplexed into a single optical signal through the optical multiplexer disposed inside the package, and the single optical signal may pass through the collimating lens and be then optically coupled to an optical fiber stub in the receptacle through a focusing lens disposed outside the package to be output externally.

The optical transmitting module may further include an optical isolator housing on the one outer surface to fix the optical isolator. The optical isolator housing may be coupled to the optical isolator through hermetic sealing.

The optical isolator may be formed such that a side surface thereof to which an optical signal is input from the collimating lens is inclined at an angle.

The package may further include a metal frame for sealing to fix the optical isolator housing to the one outer surface on which the optical isolator housing is disposed. The metal frame may include a groove used for coupling to the optical isolator housing including the optical isolator.

The package may be hermetically sealed by disposing a window glass on one side surface of the metal frame. The window glass may be disposed in parallel or inclined at an angle.

Inner parts of the optical isolator may be provided in a circular form or a polygonal form.

The package of a TO-can type or a box type may be applied to the optical transmitting module.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1A:
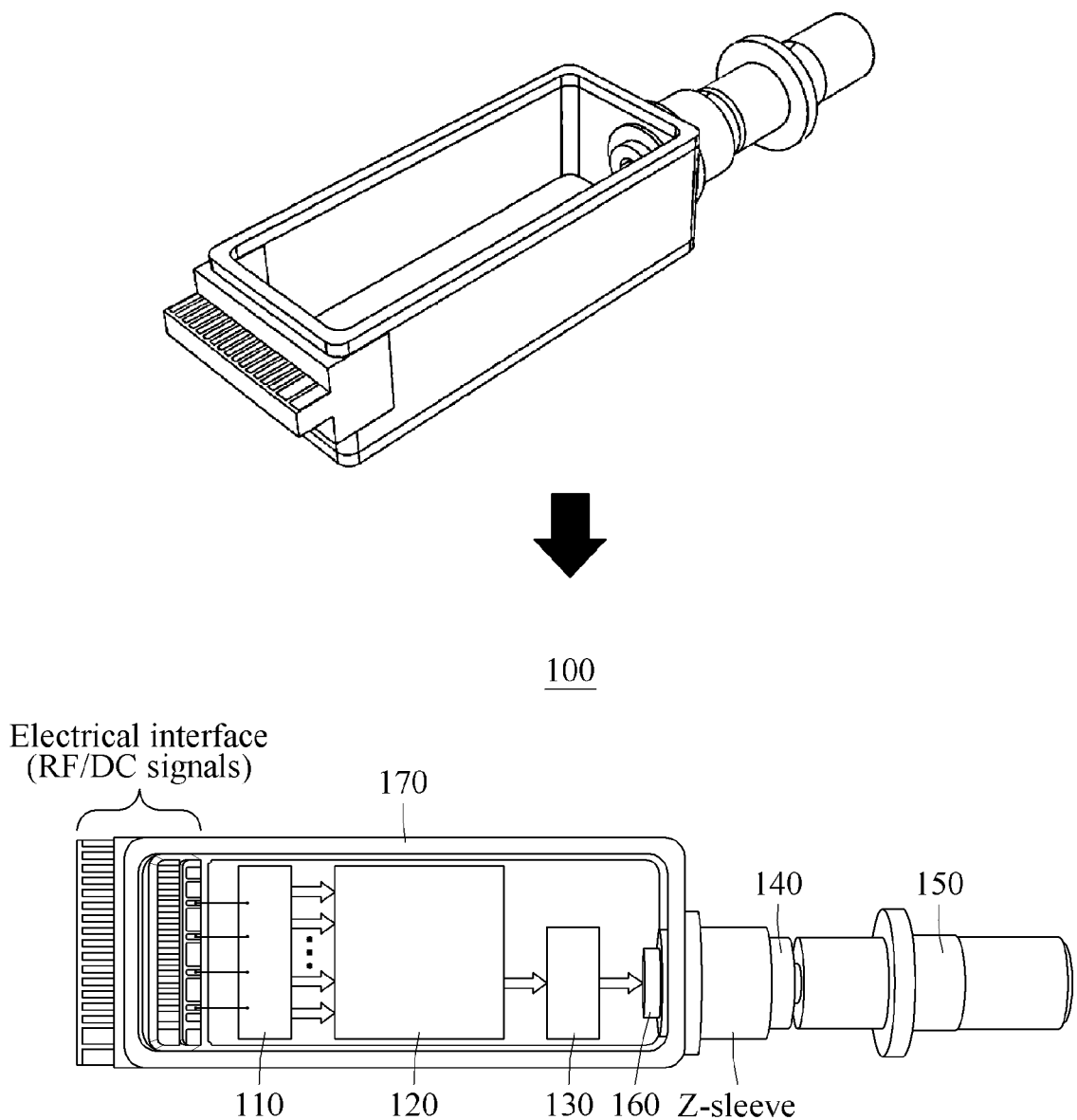
FIG. 1A illustrates a structure of an optical transmitting module according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

In a case in which an output optical signal is reflected from an external environment and then returns, an optical transmitting module may generally use an optical isolator to block the reflected and returning optical signal. An existing optical transmitting module may generally use an optical isolator integrated in a receptacle. This is because an optical signal output from an optical multiplexer is converted to a form of parallel beam by a collimating lens, and a focal length of an optical focusing lens may be restricted by a size of the optical isolator and a size of the optical transmitting module may thus increase. To prevent such an issue, provided herein is a structure of a package in which the optical isolator is integrated inside or outside the package of the optical transmitting module to be suitable for an existing package standard.

Figure 1B:
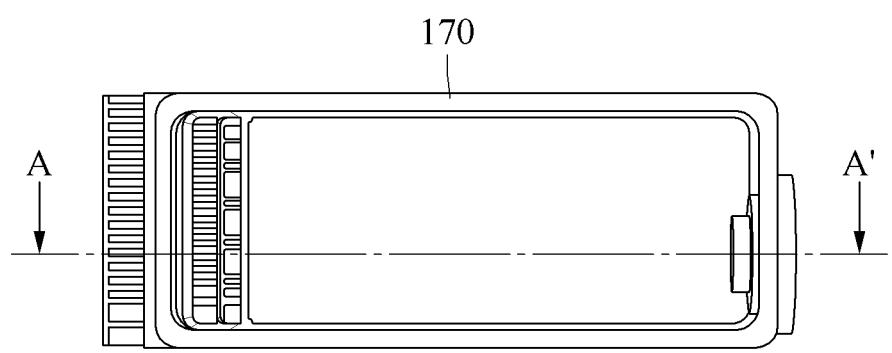
FIG. 1B illustrates a planar view of an optical transmitting module according to an example embodiment.

FIG. 1A illustrates a structure of an optical transmitting module according to an example embodiment. FIG. 1B illustrates a planar view of an optical transmitting module according to an example embodiment.

Referring to FIG. 1, an optical transmitting module 100 includes a plurality of light sources 110, an optical multiplexer 120, a collimating lens 130, a focusing lens 140, and a receptacle 150. In general, the optical transmitting module 100 may use an optical isolator 160 to block an optical signal that is output from the optical transmitting module 100 and is then reflected by an external source and returns thereto, in order to stabilize the light sources 110.

As illustrated in FIG. 1A, the optical transmitting module 100 includes a package 170 inside which the optical isolator 160 is provided, and outside which the focusing lens 140 and the receptacle 150 are disposed. That is, the optical transmitting module 100 may multiplex optical signals output from the light sources 110 into a single optical signal through the optical multiplexer 120 disposed inside the package 170. The single optical signal obtained through the multiplexing may pass through the collimating lens 130, and then be optically coupled to an optical fiber stub in the receptacle 150 through the focusing lens 140 disposed outside the package 170 to be output externally.

Through the optical isolator 160, an inside of the package 170 of the optical transmitting module 100 may be hermetically sealed. FIG. 1B illustrates a planar view of the package 170 provided in a box type that is used for the optical transmitting module 100. The optical isolator 160 may be disposed inside the package 170 of the box-type.

Figure 2:
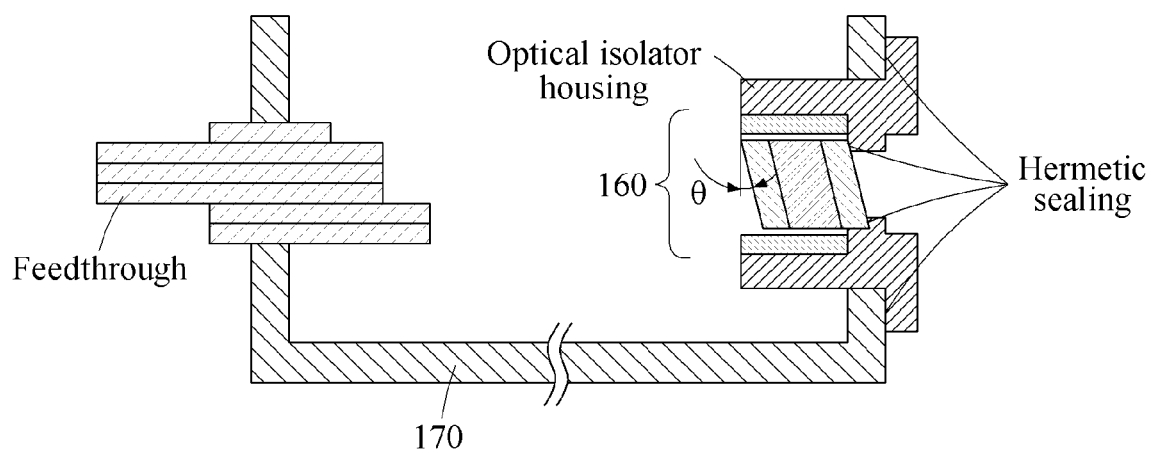
FIG. 2 illustrates a structure of a package of an optical transmitting module according to an example embodiment.

FIG. 2 illustrates a structure of a package of an optical transmitting module according to an example embodiment.

FIG. 2 illustrates a cross section of the package 170 that is shown when cut by an A-A' line of FIG. 1B. Referring to FIG. 2, the package 170 of the optical transmitting module 100 includes the optical isolator 160 disposed on one inner surface of the package 170. To fix the optical isolator 160 to the package 170, the optical transmitting module 100 may further include an optical isolator housing on the one inner surface. The optical isolator housing and the package 170 may be coupled to each other through hermetic sealing. For example, a surface on which the optical isolator housing and the package 170 are in contact may be robustly fastened through intermetallic fusion bonding, such as, for example, laser welding. Similarly, the optical isolator 160 may be coupled to the optical isolator housing through hermetic sealing.

Figure 3:
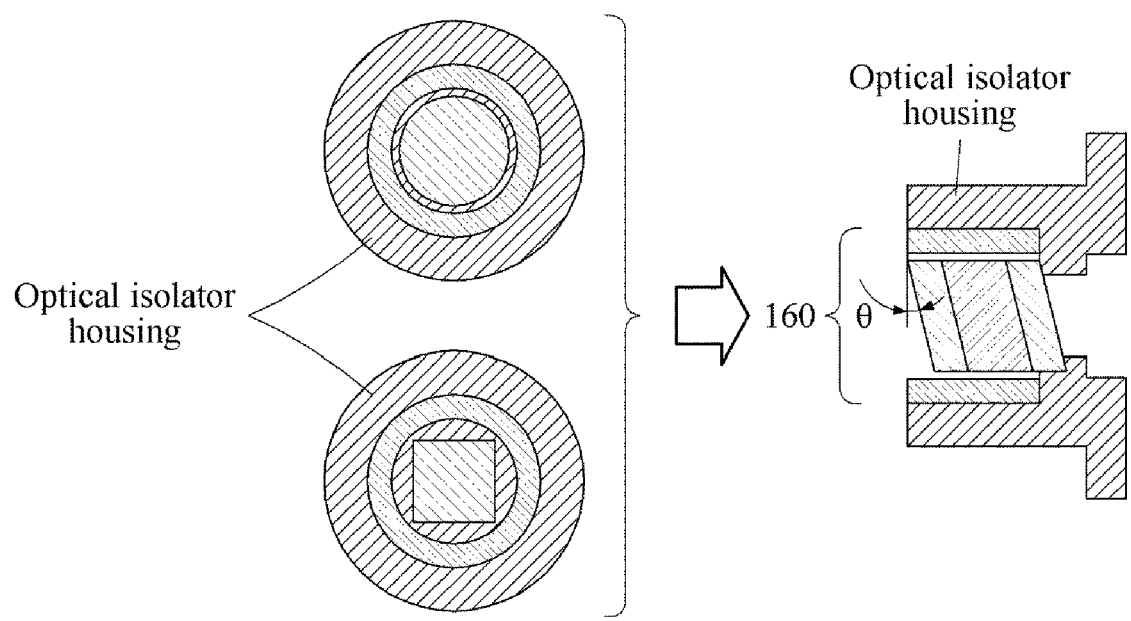
FIG. 3 illustrates a form of an optical isolator according to an example embodiment.

FIG. 3 illustrates a form of an optical isolator according to an example embodiment.

FIG. 3 illustrates a planar view of an arrow-indicating direction in which optical signals output from the light sources 110 pass through the optical multiplexer 120 and the collimating lens 130 to be incident on the optical isolator 160. The optical isolator 160 may be coupled to the optical isolator housing through hermetic sealing, and inner parts of the optical isolator 160 may be provided in a circular form or a tetragonal form as illustrated in FIG. 3. However, the form of the inner parts of the optical isolator 160 is not limited to the circular form or the tetragonal form, and thus various forms may be applied to the inner parts. In addition, the optical isolator 160 may be formed such that a side surface thereof to which an optical signal is to be input is inclined at an angle ($\theta$) relative to a direction in which the optical signal is to be incident. Since the optical isolator 160 is formed such that the side surface thereof to which an optical signal is to be input is inclined at the angle ($\theta$) as described, it is possible to reduce an internal optical reflection in the optical transmitting module 100.

The optical isolator 160 may be disposed inside the package 170, and thereby an external size of the optical transmitting module 100 may be reduced. Thus, it is possible to improve an existing structure of the package 170 in which a focal length of the focusing lens 140 is restricted by a size of the optical isolator 160 when the package 170 of the optical transmitting module 100 is optically coupled to the receptacle 150.

Figure 4A:
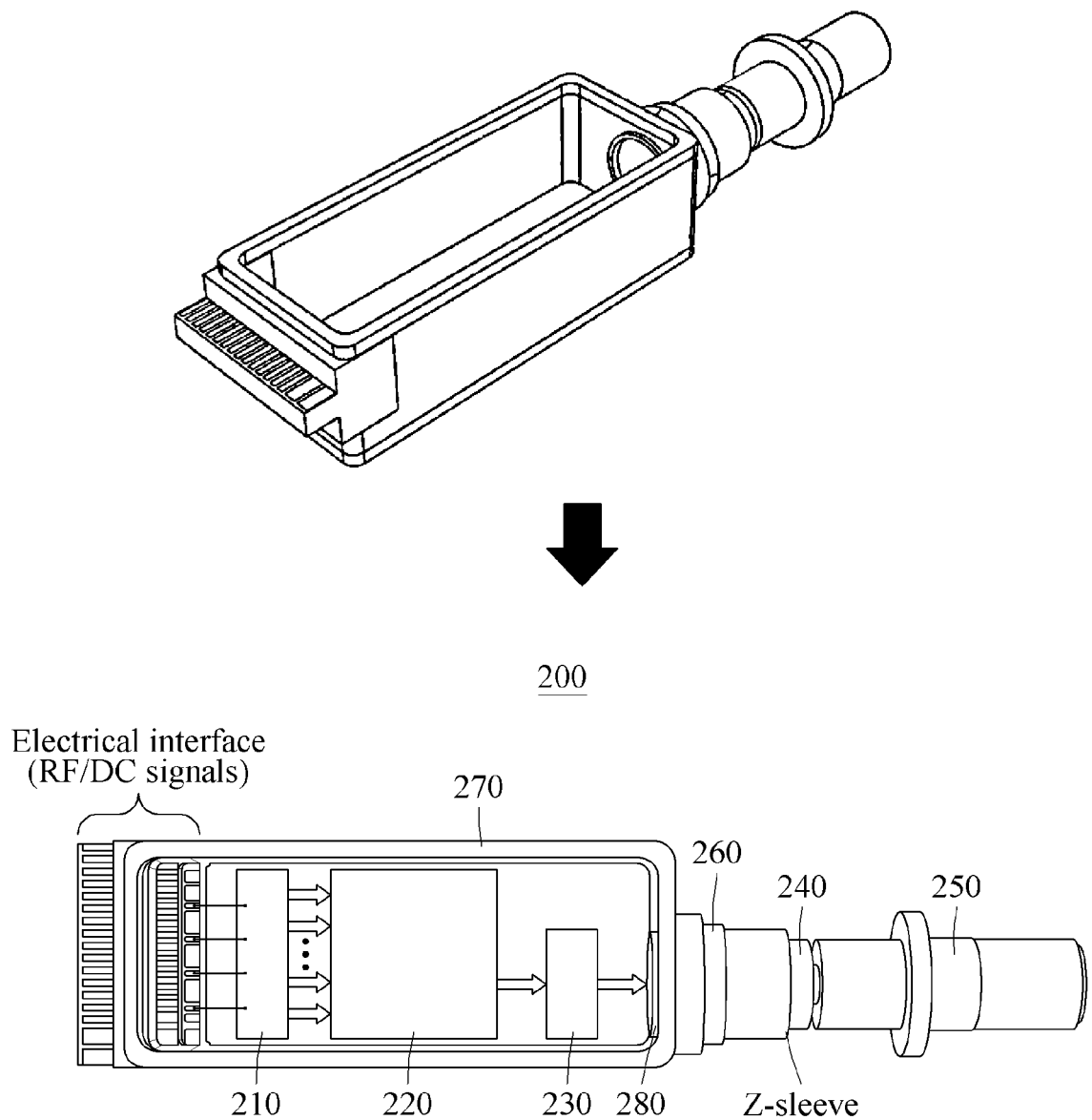
FIG. 4A illustrates a structure of an optical transmitting module according to another example embodiment.
Figure 4B:
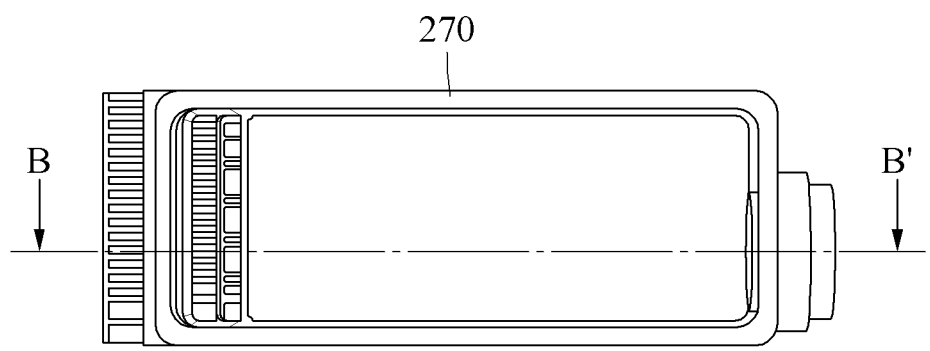
FIG. 4B illustrates a planar view of an optical transmitting module according to another example embodiment.

FIG. 4A illustrates a structure of an optical transmitting module according to another example embodiment. FIG. 4B illustrates a planar view of an optical transmitting module according to another example embodiment.

Referring to FIG. 4A, an optical transmitting module 200 includes a plurality of light sources 210, an optical multiplexer 220, a collimating lens 230, a focusing lens 240, and a receptacle 250. In general, the optical transmitting module 200 may use an optical isolator 260 to block an optical signal that is output from the optical transmitting module 100 and is then reflected by an external source and returns thereto, in order to stabilize the light sources 210.

The isolator 260 of the optical transmitting module 200 may be mounted at a rear end of a window glass 280 of a package 270, and the focusing lens 240 and the receptacle 250 may be disposed in sequential order. That is, optical signals output from the light sources 210 of the optical transmitting module 200 may be multiplexed into a single optical signal through the optical multiplexer 220 disposed inside the package 270, and then the single optical signal may pass through the collimating lens 230 and then be optically coupled to an optical fiber stub in the receptacle 250 through the focusing lens 240 disposed outside the package 270 to be output externally.

An inside of the package 270 may be hermetically sealed through the window glass 280. FIG. 4B illustrates a planar view of the package 270 of a box type that is used for the optical transmitting module 200. As illustrated in FIG. 4B, the optical isolator 260 may be disposed outside the package 270.

Figure 5:
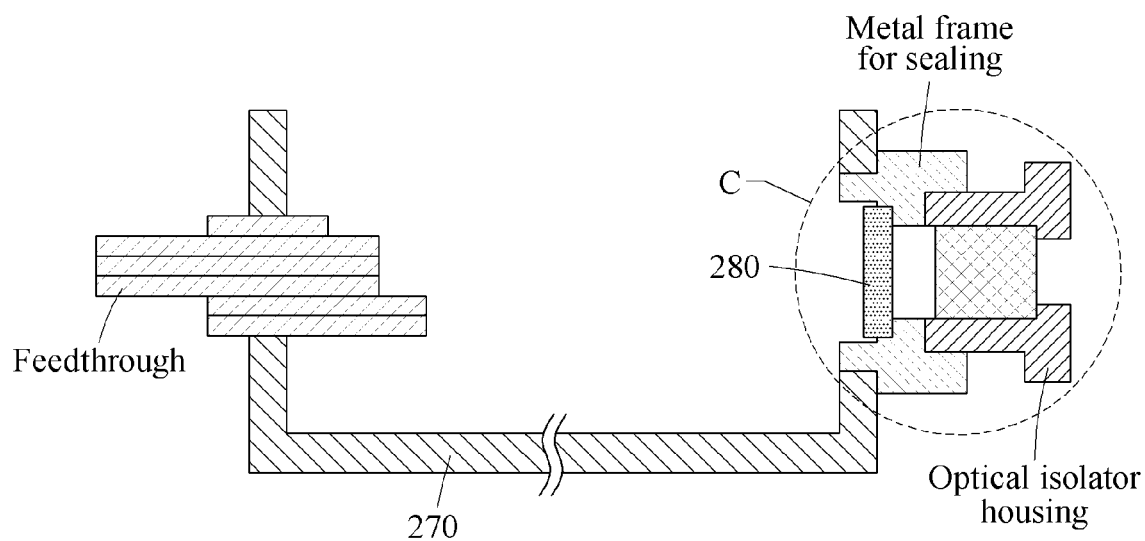
FIG. 5 illustrates a structure of a package of an optical transmitting module according to another example embodiment.

FIG. 5 illustrates a structure of a package of an optical transmitting module according to another example embodiment.

FIG. 5 illustrates a cross section of the package 270 that is shown when cut by a B-B' line of FIG. 4B. Referring to FIG. 5, the optical isolator 260 may be disposed on one outer surface of the package 270 of the optical transmitting module 200. As described above, the inside of the package 270 of the optical transmitting module 200 may be hermetically sealed through the window glass 280, and the window glass 280 may be mounted in a metal frame for sealing. Herein, the window glass 280 may be disposed in parallel as illustrated in FIG. 5, or inclined at an angle.

The metal frame may be coupled to the package 270 through hermetic sealing. In addition, the metal frame may include a groove corresponding to a standard external shape of an optical isolator housing such that the optical isolator housing in which the optical isolator 260 is mounted may be easily mounted. Herein, the metal frame and the optical isolator housing may be coupled to each other through hermetic sealing, and a surface on which the metal frame and the optical isolator housing are in contact may be robustly fastened through intermetallic fusion bonding such as laser welding. Similarly, the optical isolator 260 may be coupled to the optical isolator housing through hermetic sealing.

Figure 6:
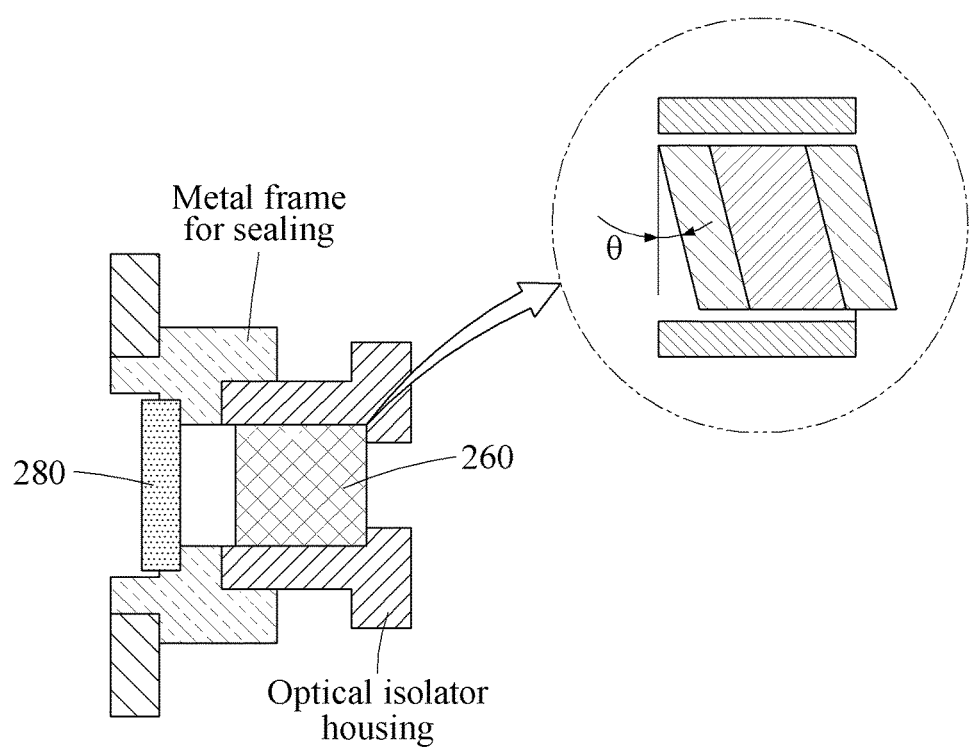
FIG. 6 illustrates a structure in which an optical isolator is embodied according to another example embodiment.

FIG. 6 illustrates a structure in which an optical isolator is embodied according to another example embodiment.

The optical isolator housing may be provided to have a T-shaped cross section as illustrated in C of FIG. 5. In addition, the optical isolator housing may also be assembled as a block into the groove formed in the metal frame as illustrated in FIG. 6. Herein, inner parts of the optical isolator 260 coupled to the optical isolator housing may be provided in a circular form or a tetragonal form as illustrated in FIG. 3. However, the form of the inner parts of the optical isolator 260 is not limited to the circular form or the tetragonal form, and thus various forms may be applied to the inner parts. In addition, the optical isolator 260 may be formed such that a side surface thereof is inclined at an arbitrary angle ($\theta$) relative to a direction in which the optical signal is to be incident.

A structure of a package for an optical transmitting module has been described herein. By integrating, into an inside of a package, an optical isolator generally used for a box type optical transmitting module, it is possible to reduce a size of the optical transmitting module and minimize a restriction by the optical isolator when being optically coupled to an outside. The optical transmitting module may not require a sealing structure using an additional light-transmissive material because hermetic sealing of the package is enabled through the optical isolator. In addition, the optical transmitting module may use an existing package, and apply a structure of the package in which the optical isolator is mounted to an outside of the package.

According to example embodiments described herein, it is possible to minimize a disadvantage of an existing structure of a package by integrating an optical isolator inside or outside the package, in lieu of a receptacle, to be suitable for an existing package standard.

The components described in the example embodiments of the present disclosure may be achieved by hardware components including at least one of a digital signal processor (DSP), a processor, a controller, an application specific integrated circuit (ASIC), a programmable logic element such as a field programmable gate array (FPGA), other electronic devices, and combinations thereof. At least some of the functions or the processes described in the example embodiments of the present disclosure may be achieved by software, and the software may be recorded on a recording medium. The components, the functions, and the processes described in the example embodiments of the present disclosure may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An optical transmitting module comprising:
a package inside which light sources, an optical multiplexer, and a collimating lens are provided; and
an optical isolator disposed on one inner surface of the package and configured to block an optical signal reflected and returning from an outside of the optical transmitting module,
wherein optical signals output from the light sources are multiplexed into a single optical signal through the optical multiplexer, and the single optical signal passes through the collimating lens and is then optically coupled to an optical fiber stub in a receptacle through a focusing lens disposed outside the package to be output externally, and
wherein the optical isolator is formed such that a side surface thereof to which an optical signal is input from the collimating lens is inclined at an angle.

2. The optical transmitting module of claim 1, wherein the package further comprises:
an optical isolator housing on the one inner surface to fix the optical isolator,
wherein the optical isolator housing is coupled to the package through hermetic sealing.

3. The optical transmitting module of claim 2, wherein the optical isolator is coupled to the optical isolator housing through hermetic sealing.

4. The optical transmitting module of claim 1, wherein inner parts of the optical isolator are provided in a circular form or a polygonal form.

5. The optical transmitting module of claim 1, to which the package of a transistor outline (TO)-can type or a box type is applied.

6. An optical transmitting module comprising:
a package inside which light sources, an optical multiplexer, and a collimating lens are provided; and an optical isolator disposed not in a receptacle but on one outer surface of the package, and configured to block an optical signal reflected and returning from an outside of the optical transmitting module, wherein optical signals output from the light sources are multiplexed into a single optical signal through the optical multiplexer, and the single optical signal passes through the collimating lens and is then optically coupled to an optical fiber stub in the receptacle through a focusing lens disposed outside the package to be output externally, and wherein the optical isolator is formed such that a side surface thereof to which an optical signal is input from the collimating lens is inclined at an angle.

7. The optical transmitting module of claim 6, further comprising:

an optical isolator housing on the one outer surface to fix the optical isolator, wherein the optical isolator housing is coupled to the optical isolator through hermetic sealing.

8. The optical transmitting module of claim 7, wherein the package further comprises:

a metal frame for sealing to fix the optical isolator housing to the one outer surface on which the optical isolator housing is disposed, wherein the metal frame includes a groove used for coupling to the optical isolator housing including the optical isolator.

9. The optical transmitting module of claim 8, wherein the package is hermetically sealed by disposing a window glass on one side surface of the metal frame, wherein the window glass is disposed in parallel or inclined at an angle.

10. The optical transmitting module of claim 6, wherein inner parts of the optical isolator are provided in a circular form or a polygonal form.

11. The optical transmitting module of claim 6, to which the package of a transistor outline (TO)-can type or a box type is applied.

* * * * *